Nov. 21, 1939.   H. R. MORTON   2,180,477
WORK LOCATING AND TOOL GUIDING MEANS FOR KEYWAY FORMING DEVICES
Filed Feb. 24, 1938   3 Sheets-Sheet 1
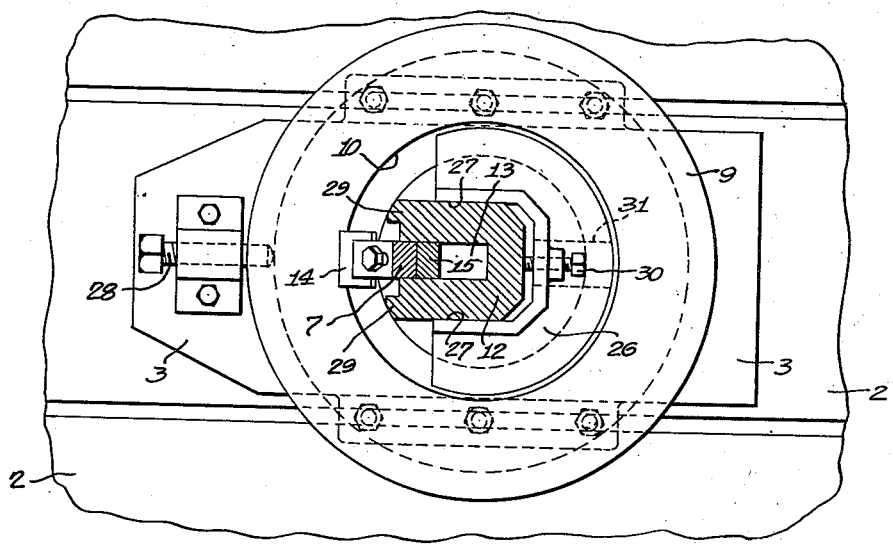
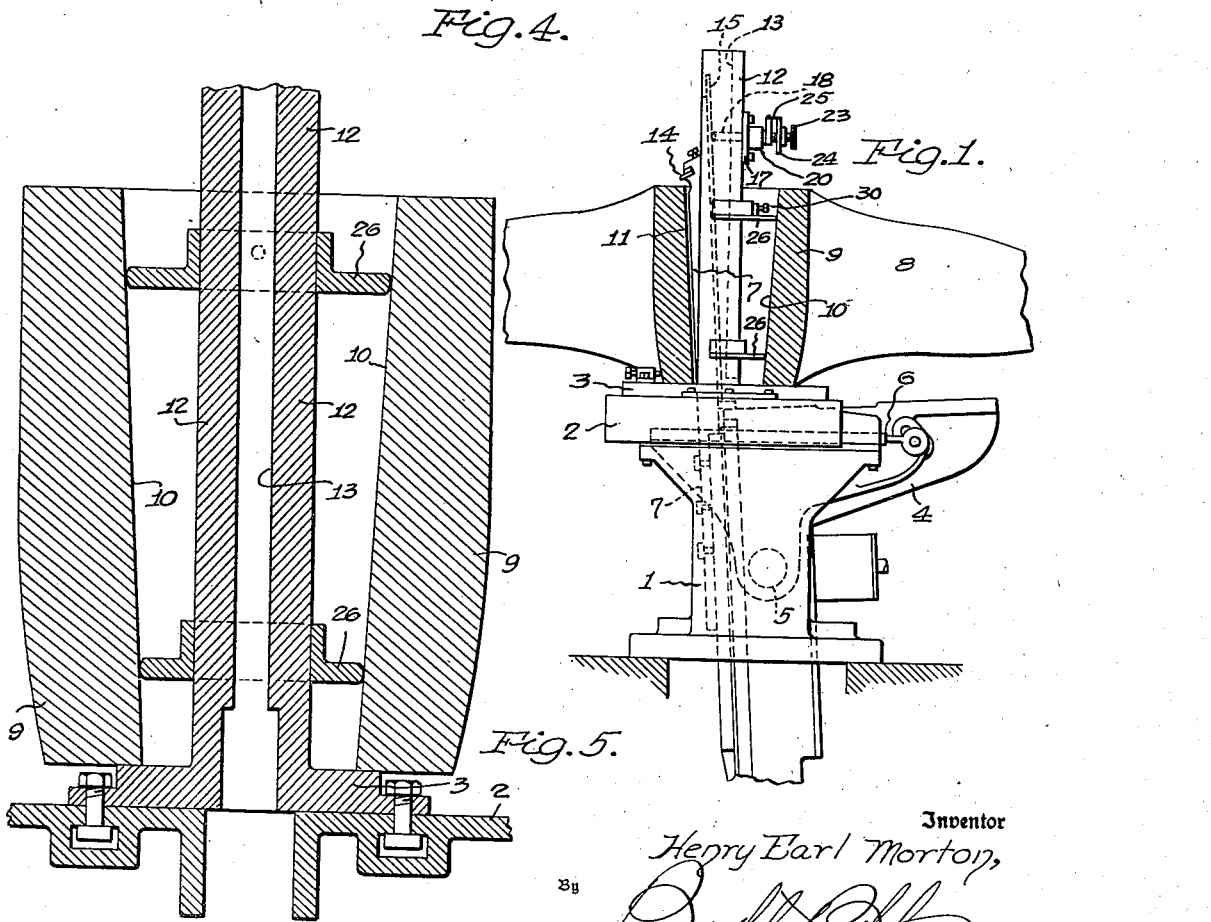
Inventor
Henry Earl Morton,
By
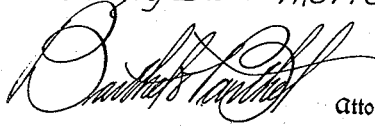
Attorneys

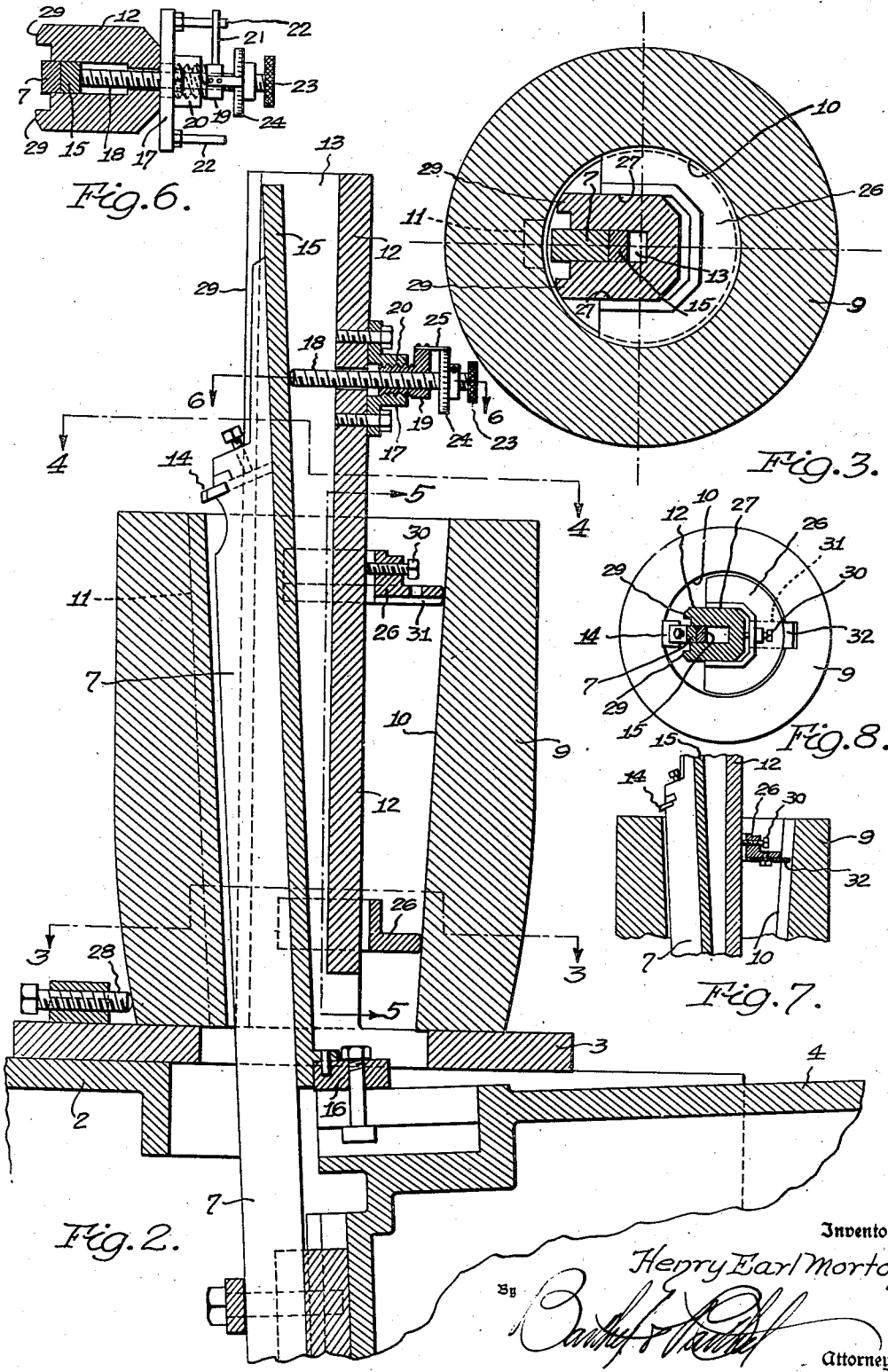

Nov. 21, 1939.   H. R. MORTON   2,180,477
WORK LOCATING AND TOOL GUIDING MEANS FOR KEYWAY FORMING DEVICES
Filed Feb. 24, 1938   3 Sheets-Sheet 3

Inventor
Henry Earl Morton,
By
Attorneys

Patented Nov. 21, 1939

2,180,477

UNITED STATES PATENT OFFICE 2,180,477

WORK LOCATING AND TOOL GUIDING MEANS FOR KEYWAY FORMING DEVICES

Henry Earl Morton, Muskegon Heights, Mich.

Application February 24, 1938, Serial No. 192,335

20 Claims. (Cl. 90—43)

This invention relates to means for application to a machine suitable for use in connection with means for forming keyways in the walls of bores of large heavy work pieces, said means embodying the invention, being for the purpose of accurately locating the work relative to a keyway forming instrumentality, and for guiding said instrumentality within the bore of the work.

An object of the present invention is to provide simple and efficient means readily applicable to a machine adapted to operate a keyway forming instrumentality and which means is adapted to accurately locate the work relative to said instrumentality when located within the bore, for accurately guiding said instrumentality, said guiding means being adjustable to insure the accurate forming of a keyway in the wall of said bore with the longitudinal center line of said keyway co-incident with a radial plane of the bore and with the bottom of the keyway parallel with the longitudinal surface of the wall of the bore.

A further object is to provide a support rigidly mounted upon the machine and projecting into the bore of the work to support said guiding means, and further to provide means to be inserted within said bore for centering the work relative to said support, laterally thereof.

It is also an object to provide a longitudinally reciprocable tool carrying bar which is guided in its reciprocation by said guiding means mounted upon said fixed support, said guiding means and bar being adjustable upon said support to bring said bar and guide into parallelism with the wall of the bore when said bore is formed longitudinally tapering, and it is also an object to provide lateral guiding means upon said support for said bar to guide said bar in forming a keyway which is tapered longitudinally in width.

A further object is to provide certain other new and useful features in the construction, arrangement and combination of parts, all as hereinafter set forth, reference being had to the accompanying drawings wherein, Figure 1 is a side elevation of a machine for use in forming keyways in large heavy pieces of work and showing the work in place thereon and means embodying the present invention in operative position upon the machine and within the bore of the work within which a keyway is to be formed;

Fig. 2 is a longitudinal vertical section through the bore of the work and upper part of the machine upon which the work is supported and also through the means embodying the present invention, which means is operatively attached to the machine and extends through the bore of the work;

Fig. 3 is a transverse section substantially upon the line 3—3 of Fig. 2;

Fig. 4 is a transverse section substantially upon the line 4—4 of Fig. 2;

Fig. 5 is a vertical section substantially upon the line 5—5 of Fig. 2;

Fig. 6 is a horizontal section substantially upon the line 6—6 of Fig. 2;

Fig. 7 is a longitudinal sectional detail of the upper end portion of the bore of the work and means therein embodying the present invention, drawn to a reduced scale and illustrative of a modified construction;

Fig. 8 is a plan view of Fig. 7 with parts shown in cross section;

Figure 9:
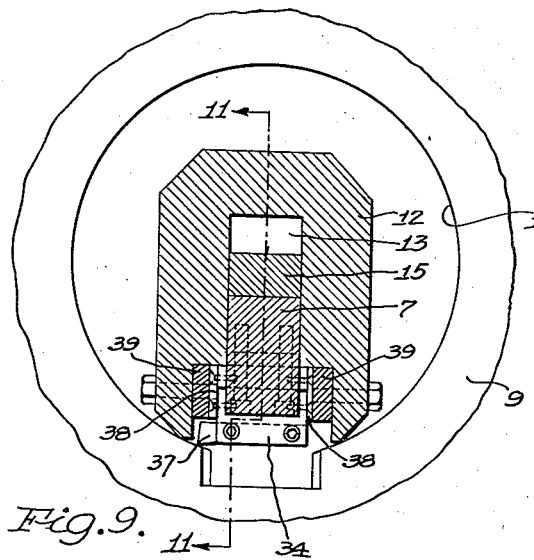
Fig. 9 is a plan view of the upper end of the work showing the means embodying the present invention in place within the bore of the work and disclosing a modified construction adapted to form a keyway longitudinally tapered in width.

In forming keyways in the bores of very large heavy pieces of work, such as the hubs or large screw propellers which in some instances may weigh many tons, it is extremely difficult to locate the keyway accurately in the wall of the bore with its longitudinal center line exactly co-incident with a radial plane of the axis of the bore, and the present invention is designed to so locate the work relative to supporting and guiding means within the bore of the work for the keyway forming instrumentalities, that the keyway will be properly and accurately formed relative to such longitudinal axial plane of the bore of the work. The present invention relates to such means for so locating work, said means being readily applicable to a machine suitable for supporting and operating a tool bar having a tool for forming the keyway in the wall of the bore of the work.

As illustrative of one form of machine adapted to support the work and to operate a tool bar within the bore of the work, a machine of substantially the form and construction shown in Patent No. 2,084,061 of June 15, 1937, is shown as illustrative of a machine suitable for the purpose, said machine as illustrated in Fig. 1, including a suitable supporting frame or stand 1 upon the upper end of which is supported a table 2 upon which table is mounted a base plate 3, which plate forms a support for the work, and mounted within the stand or supporting frame 1 is a carrier 4 pivotally supported at 5 for tilting movement upon a slide 6 and for movement with said slide, said carrier carrying a tool bar 7 mounted thereon for longitudinal reciprocation relative thereto, and suitable power means is provided on the machine for reciprocating said bar and its tool within the bore of the work, said tool bar being movable with the movement of the slide toward and from the wall of the bore and also tiltable with the tilting of the carrier to incline the bar from the vertical, to correspond in its inclination, to the taper of the wall of the bore, all substantially as shown and described in said above mentioned Letters Patent.

As illustrative of a work piece having a tapered bore within which it is desired to form a longitudinal keyway, a large heavy screw propeller wheel indicated as a whole by the numeral 8, is shown, and this propeller has a hub 9 formed with a longitudinally tapered bore 10 in the wall of which it is desired to form a suitable keyway 11. The work 8 is placed with an end of its hub 9 resting upon the base plate 3, but to properly locate the work relative to the keyway forming instrumentality or tool bar 7 and its cutting tool projecting into said bore 10, a centering post 12 rises vertically from the base plate 3 and is rigidly secured to or formed integral with said base plate at its lower end, thus forming a rigid centering member extending vertically from the base plate through the bore of the work and about which post the bore of the work is adapted to be centered.

This centering post is of channel form, being substantially of rectangular shape in cross section and formed with a longitudinal channel 13 throughout its length and opening through one face of said post to receive the upper end portion of the tool bar 7 which carries a cutting tool 14 and which bar fits laterally within said channel and is backed up therein by a backing bar 15 rigidly secured in any suitable manner, as at 16, to the tiltable carrier 4 to tilt therewith upon adjustment thereof and with the tool bar 7 within said channel, relative to the slide 6 upon which said carrier is mounted, said adjustment being for the purpose of bringing said tool and backing bars into parallelism with the wall of the tapered bore of the work, said backing bar being for the purpose of backing up the tool bar against the thrust of the tool in making the cut upon the down stroke of the tool bar which slides in contact with said backing bar 15.

As the bar 15 and tool bar 7 are carried by said carrier 4 and as said carrier is mounted upon the reciprocable slide 6 of the machine, they will advance from and be retracted into the open side of said channel of the post 12 in timed relation to the longitudinal reciprocation of the tool bar by the operation of the machine in reciprocating said slide. Therefore the tool bar is advanced toward the work upon each down stroke to make the desired depth of cut and is retracted upon each up stroke to clear the tool from the work, and as the backing bar is mounted upon the carrier 4, it is also advanced and retracted with the tool bar.

As the backing bar 15 is rigidly secured at its lower end to the carrier 4, it is moved directly by and with the movement of the carrier, but if the upper end of this backing bar be not backed up or supported within the upper end of the channel 13 of the post 12, it may yield inwardly of the channel together with the tool bar under the force applied thereto by the tool 14 in making the cut, and therefore suitable abutment means is mounted upon the post 12 to prevent such yield of the tool and backing bars away from the work and inwardly of the channel 13 upon the cutting stroke.

This abutment means which is indicated as a whole by the numeral 17 includes an abutment screw 18 which passes freely through an opening in the wall of the post at the bottom of the channel 13 with its inner end in contact with the backing bar 15 and with said screw passing through an axial screw-threaded opening in a nut 19, which nut is screwed into the screw-threaded bore of a collar 20 which is rigidly secured in any suitable manner to the wall of the post in which the opening for the abutment screw is provided. The internal screw thread of the collar is preferably of a steep pitch so that the nut 19 will be given a comparatively quick and extended longitudinal movement by a partial turn of the nut by means of a rigid arm 21 extending laterally from the head of the nut and adapted to engage at its outer end, one or the other of the two stop pins 22 extending longitudinally of the abutment screw laterally of the head of the nut so that upon turning movement of the nut 19 in one direction by means of the arm 21 to bring said arm into contact with one of the stop pins, said nut, together with the abutment screw, will be moved longitudinally to advance the abutment screw toward the backing bar 15. The abutment means is thus adjusted by hand at the beginning of each down stroke of said tool bar, to bring the abutment screw into contact with the backing bar, and at the beginning of each up stroke, said nut is turned by hand in an opposite direction by bringing said arm 21 into contact with the other stop pin, thus retracting the abutment screw to permit retraction of the tool bar by the operation of the machine in moving the slide 6 to give clearance for the tool upon the up stroke of said tool bar.

As the backing bar and tool bar are advanced the depth of the cut at the beginning of the down stroke of the tool bar, and as these bars are then retracted a like distance at the lower end of the stroke, in order that the abutment screw be maintained in contact with the backing bar throughout the several cutting strokes of the tool bar, it is necessary to adjust the abutment screw at the beginning of each down stroke of the tool bar, independently of the adjustment effected by the adjustment of the nut 19 by the turning of the arm 21, and to effect such independent adjustment, the abutment screw is provided with a knurled head 23 on its outer end by means of which the screw may be turned by hand within the nut 19 and moved endwise toward the backing bar a distance equal to the depth of each cut. To indicate the depth of each cut, a disk 24 is adjustably secured upon the abutment screw adjacent the outer end of the nut 19 which is provided with a pointer 25 to project over the edge of the disk 24 which is provided with graduations. Therefore the longitudinal adjustment of the abutment screw effected by turning the screw inwardly of the nut, is indicated by the pointer 25 and graduations upon the disk. At the beginning of the operation, the abutment screw is adjusted into engagement with the backing bar and this adjustment will be indicated upon the indicator disk 24, as zero. At the beginning of the next succeeding cut and the turning of the abutment screw to adjust it into engagement with the backing bar, such further adjustment will be indicated by the turning of the disk relative to the pointer 25, and in a like manner succeeding adjustments for succeeding cuts will be indicated upon the indicating disk, and by noting the several adjustments as indicated upon the disk, the operator will know when the desired depth of the keyway has been reached.

It is very essential that the keyway be formed in the wall of the bore of the work with the longitudinal center line of the keyway coinciding with a longitudinal radial plane of the work, that is, that the keyway will be formed in the wall of the bore of the work exactly opposite the axis of the bore, and to insure such accurate adjustment of the work relative to the centering post 12, one or more jig plates are employed, each comprising a disk-shaped member 26 having a diameter exactly corresponding to the diameter of the bore of the work at the point of engagement of the jig with the wall of the bore. Each jig plate is also cut away at one lateral side less than one-half of the circle, and extending inwardly of the plate from said cut-away side is a notch or groove 27 the width of which is such as to fit closely against opposite side surfaces of the post 12 so that when the jig plate is inserted in the bore of the work with the post received within its notch, the work will be exactly centered about the post in one direction, that is, laterally of the post, but the work will be free to move relative to the post in a plane at right angles to the transverse plane passing through the axis of the bore due to engagement of the post within the open side of the notch 27, and therefore the keyway will be formed in the wall of the bore of the work exactly co-incident with the longitudinal transverse plane passing through the axis of the bore.

As the tool bar 7 is guided within the channel 13 of the post 12 and projects from said channel, said bar is held in exact position laterally of the post and in a position to correctly form the keyway in the wall of the bore upon the longitudinal axial plane of the bore, and to properly position the work in the direction of the length of this plane transversely of the work, in positioning the work, it is forced or moved along this plane upon the base plate 3 by means of an adjusting screw 28 on said plate to engage with the work and move it toward the post 12 which is provided with side ribs 29 projecting from one side of the post and at opposite sides of the channel 13 therein, the outer surfaces of these ribs being formed to engage the wall of the bore of the work when the work is moved by means of the adjusting screw 28.

The periphery of each jig plate defines more than a half circle and therefore when it is dropped into the bore of the work with the post received within its notched side 27, it will fit within the bore to prevent its movement therein, and where the bore of the work is tapered longitudinally as shown, two of these jig plates may be employed, the lower one being of slightly greater diameter than the diameter of the bore adjacent its lower end so that this lower plate when dropped into place in the bore will not pass completely through the bore but will wedge therein and serve to center the lower end of the bore of the work, and the upper jig plate will preferably be formed of slightly greater diameter than the diameter of the bore of the work inwardly a short distance from the upper or large end of the bore so that this plate will also wedge within the bore and serve to center the upper end of the bore of the work. Where the bore of the work is straight or of the same diameter throughout its length, similar jig plates may be employed to center the work relative to the post 12 but in that case it will be necessary to provide stop means (not shown) for limiting the movement of the jig plates longitudinally of the bore.

The lower end surface of the hub 9 may not be formed exactly at right angles to the vertical axis of the bore of the work and in that case the hub of the work must be tilted slightly and held in that position. This is usually performed by placing shims under one edge of the hub, and the accuracy of such adjustments may be determined by the operation of the jig plates, the upper of which may be provided with an adjustment screw 30 to engage the vertical side of the fixed post 12 opposite the open side of the channel in said post through which the tool bar projects.

When it is desired to form more than one keyway in the wall of the bore of the work, with the second keyway accurately positioned relative to the first keyway formed in the bore, this may be accurately accomplished by forming a groove 31 in the lower side of the upper jig plate 26 and securing within this groove a tongue 32 as shown in Fig. 7 to engage the first formed keyway, and thus the other keyway or keyways may be very accurately located in the wall of the bore relative to the first keyway formed therein.

Figure 13:
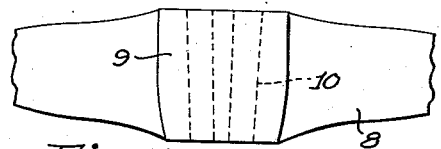
Fig. 13 is a side elevation of the work which is illustrated as comprising a large propeller wheel having a tapered bore in its hub which bore is indicated in dotted lines as being provided with a longitudinally tapered keyway.
Figure 12:
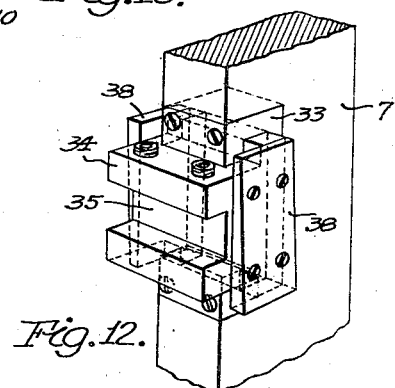
Fig. 12 is a perspective view of the tool holder and tool bar shown in Figs. 9 and 10.
Figure 10:
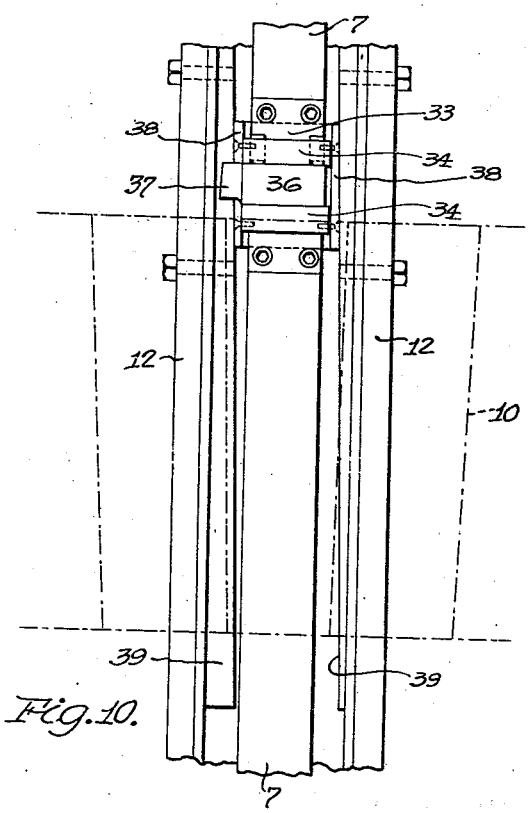
Fig. 10 is a side elevation of Fig. 9 with the work indicated in dot and dash lines.
Figure 11:
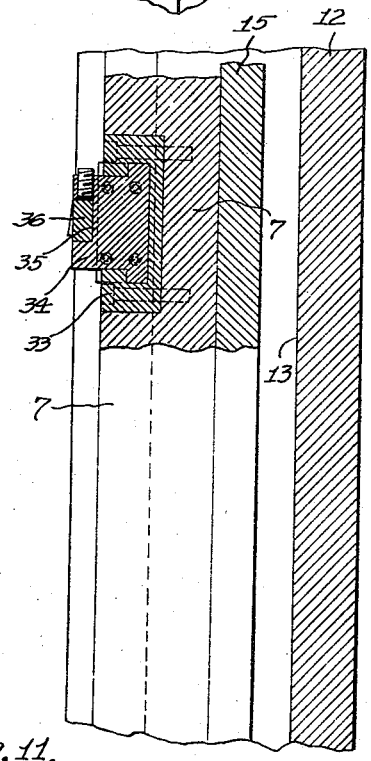
Fig. 11 is a section substantially upon the line 11—11 of Fig. 9.

The modified construction shown in Figs. 9 to 12 inclusive consists of a modified cutting tool for cutting the side walls of a keyway so that these walls may be tapered longitudinally to provide a longitudinally tapering keyway as indicated in dotted lines in Fig. 13. In forming such a longitudinally tapering keyway, a tool holder is provided comprising a block 33 secured within a notch or recess in the edge of the tool bar 7 and this block 33 is formed with ways to receive a tool holder 34 having a transverse slot in its outer side as at 35 to receive the tool 36 which extends transversely of the bar 7 and has a bit or cutting end 37 at one end only to engage and cut one side wall of a keyway which has been previously formed in the wall of the bore of the work. One side wall of the keyway is therefore formed by the tool 36 with an inclination or taper, by moving the tool holder transversely of the tool bar as the tool bar descends, by providing longitudinally tapered guide plates 38 detachably secured to the ends of the tool holder 34 to engage similarly tapered filler plates 39 detachably secured to the side walls of an auxiliary channel formed in the post 12 at the outer end of the channel 13. The opposed filler plates 39 are tapered in opposite directions as are also the guide plates 38 and therefore the opposed faces of these plates 39 which are contacted by the guides 38, are parallel, and the channel formed therebetween is of the same width throughout its length. Therefore in making the cut, the tool holder 34 will be moved endwise by the engagement of these guide plates with the filler plates and thus move the tool 36 longitudinally or in a direction transversely of the keyway to form one of the side walls of the keyway with a longitudinal taper. The opposite wall of the keyway may be formed in a like manner by detaching the guide plates 38 and filler plates 39 and turning all of them end for end and again securing them to the ends of the holder 34 and side walls of the channel so that the holder will be moved endwise together with the tool 36 and form the opposite wall of the keyway with an inclination opposite to that of the opposed side wall.

Other changes or modifications in the construction or arrangement of parts of the present device may be made without departing from the spirit of the invention and I do not, therefore, limit myself to the particular construction shown.

Having thus fully described my invention what I claim is:

1. Means for the purpose described including a centering post for rigid connection to a work support of a machine, said post being adapted to project into a bore in the work in the wall of which bore a keyway or channel is to be formed, and means adapted to fit within the bore of the work between the wall of the bore and said post to center the work relative to said post.

2. Means for the purpose described including a rigid centering member for connection to a work support of a keyway forming machine, to project into a bore of the work in the wall of which bore a keyway is to be formed, and a member within said bore having a periphery to conform to the wall of the bore and formed to closely engage side walls of said centering member to center the work relative to said member.

3. Means for the purpose described including a post rigidly connected at one end to a work support of a machine and adapted to project into and through a bore in the work, said post being of substantially rectangular form in cross section, and a member adapted for insertion in the bore of the work, the periphery of which member is of such form as to fit the bore of the work and is provided with a notch in one side to receive said post, the work being centered laterally of said post in one direction by said member.

4. Means for the purpose described including a centering post for rigid connection at one end to the work support of a keyway forming machine and to project into a bore of the work in the wall of which bore a keyway is to be formed, a centering member to fit within the bore of the work and formed with a notch in one side to receive said post, the periphery of said member being formed to engage the wall of the bore throughout a length greater than one-half the inner circumference of said bore, said post being formed with a longitudinal channel, and a tool bar for reciprocation longitudinally within said channel.

5. A device for the purpose described including a vertical post having a longitudinal channel in one side and rigidly connected at its lower end to a work supporting member of a machine and adapted to project into and through a bore in the work, means within the bore of the work adapted to fit closely therein between the wall of the bore and side walls of said post, and a tool bar within said channel of said post and adapted to be reciprocated longitudinally within said channel by the machine.

6. A device as characterized in claim 5, and including a backing member for said tool bar within said channel of said post and in contact with which said tool bar is longitudinally reciprocable.

7. A device as characterized in claim 5, and including a backing bar within the channel of said post to engage said tool bar, and abutment means carried by said post to engage said backing bar within said channel and take the thrust of the tool inwardly of said channel.

8. A device for the purpose described including a rigid post having a channel opening through one side of said post, said post adapted to be rigidly connected at its lower end to a work supporting member of a machine adapted for use in forming a keyway in the wall of a bore of extended length in a heavy work piece, said post being adapted to extend into and through said bore in the work, a longitudinally reciprocable tool bar adapted to be reciprocated longitudinally within said channel of said post by the operation of said machine, a backing bar within said channel in contact with which said tool bar is reciprocable, the upper end of said tool bar and said backing bar being extended within said channel beyond the upper end of the bore of the work, and abutment means carried by said post and adjustable into and out of engagement with said backing bar to take the thrust of the tool carried by said tool bar in making the cut.

9. A device as characterized in claim 8, and wherein said abutment means includes an abutment screw extending through an opening in the wall of the post and into engagement with said backing bar, said abutment screw being carried by means mounted upon said post for quickly adjusting said abutment screw longitudinally.

10. A device as characterized in claim 8, and wherein said abutment means includes an abutment screw mounted for longitudinal adjustment within a nut member having an external screw thread and adapted to be received within an internally screwthreaded collar secured to said post, and means for turning said nut member in either direction to adjust said abutment screw longitudinally toward and from said backing bar and tool bar.

11. A device as characterized in claim 8, and wherein said abutment means includes an abutment screw passing freely through an opening in a wall of said post and into engagement with the inner side of said backing bar, an internally screwthreaded collar secured to said post, a nut in screwthreaded engagement with said abutment screw and externally screwthreaded to screw into said collar, means for turning said abutment screw to adjust the same within said nut, and means for turning said nut independently of the turning movement of said abutment screw.

12. A device as characterized in claim 8, wherein said abutment means includes an abutment screw projecting freely through an opening in the bottom wall of the channel of said post and into contact with said backing bar, a nut mounted upon said abutment screw in screwthreaded engagement therewith, a collar secured to said post and internally screwthreaded to receive the externally screwthreaded nut, a head on said nut, lever means projecting from said head of said nut for turning said nut in either direction, stop means for limiting the turning movement of said nut in each direction, means for turning said abutment screw independently of the turning movement of said nut, and indicating means carried by said abutment screw to indicate the amount of adjustment of said abutment screw independently of the longitudinal adjustment of said screw by the turning movement of said nut.

13. A device for the purpose described including a post having a channel opening through one side of said post, said post adapted to be rigidly supported at its lower end and adapted to project through a tapered bore of extended length within a work piece, a tool bar longitudinally reciprocal relative to and guided within the channel of said post and projectible through and retractible into the open side of said channel, said tool bar being adjustable into parallelism with the tapering wall of said tapered bore, and abutment means carried by said post for taking the thrust of the tool carried by said tool bar in making the cut in forming a keyway in the wall of the bore of the work.

14. A device as characterized in claim 13, and including members to fit within the bore of the work at the ends of the bore and each formed with a notch to receive said post.

15. A device for the purpose described including a post having a channel in one side and adapted to be rigidly supported at its lower end in a vertical position to project through a bore of extended length within a heavy work piece, a longitudinally reciprocable tool bar within said channel of said post, a tool holder carried by said tool bar and having a cutting tool movable transversely of said tool bar for forming the side walls of a channel formed in the wall of the bore of the work, and means carried by said tool holder for moving said tool transversely of said tool bar during reciprocation of said bar to form a side wall of said channel in the work with a longitudinal taper.

16. A device as characterized in claim 13, and wherein said means for moving said tool during reciprocation of said tool bar comprises longitudinally tapered plates secured to the side walls of a channel in said post.

17. A device for the purpose described including a post rigidly supported at its lower end and formed with a longitudinal channel opening through one side of said post, a tool bar longitudinally reciprocable in said channel, a tool holder mounted upon said tool bar for movement transversely of said tool bar, a tool carried by said tool holder and extending transversely of said tool bar, and longitudinally tapered guide plates detachably secured to the side walls of said channel in said post for moving said tool holder and tool in a direction transversely of said tool bar to bring said tool into engagement with the side wall of a keyway or channel formed in the wall of the bore of the work to form said wall longitudinally tapering.

18. A device of the character described including a fixed vertical post adapted to extend through a bore in a heavy work piece, said post being formed with a longitudinal channel opening through one side of said post, a tool bar longitudinally reciprocable in said channel, a tool holder mounted in ways upon said tool bar for movement transversely of said bar, a tool carried by said tool holder and adapted to engage a side wall of a channel or keyway formed in the wall of the bore of the work, longitudinally tapered guide plates detachably secured to the ends of said tool holder, and longitudinally tapered filler plates to engage said guide plates and detachably secured to the opposite side walls of the channel in said post.

19. A device for the purpose described including a rigidly supported post having a longitudinally extending channel opening through one side of said post, said post being adapted to extend through a bore of extended length in a work piece, a tool bar reciprocable in said channel of said post and adjustable therein to project from the open side of said channel and movable toward and from the wall of the bore to form a keyway in the wall thereof, a member adapted to fit within the bore of the work between opposite sides of said post and the wall of the bore to center the work relative to said post laterally of said post, and adjustable means for moving the work relative to said post in a vertical plane extending in a direction at right angles to the lateral centering of the work by said means.

20. A device as characterized in claim 19, and wherein said means fitting within the bore of the work is provided with a tongue to engage a keyway previously formed within the bore of the work to locate a second keyway in proper position relative to said previously formed keyway.

HENRY EARL MORTON.